US012366189B2

(12) United States Patent
Matsuura

(10) Patent No.: US 12,366,189 B2
(45) Date of Patent: Jul. 22, 2025

(54) MARINE VESSEL AND EXHAUST MANIFOLD FOR MARINE VESSEL

(71) Applicant: YAMAHA HATSUDOKI KABUSHIKI KAISHA, Iwata (JP)

(72) Inventor: Satoshi Matsuura, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 18/931,156

(22) Filed: Oct. 30, 2024

(65) Prior Publication Data

US 2025/0172081 A1 May 29, 2025

(30) Foreign Application Priority Data

Nov. 29, 2023 (JP) ................................ 2023-202224

(51) Int. Cl.

| | |
|---|---|
| ***F01N 3/04*** | (2006.01) |
| ***B63H 21/38*** | (2006.01) |
| ***F01N 13/00*** | (2010.01) |
| *B63H 21/14* | (2006.01) |
| *F02B 75/18* | (2006.01) |

(52) U.S. Cl.

CPC ........... *F01N 3/046* (2013.01); *B63H 21/383* (2013.01); *F01N 13/004* (2013.01); *B63H 21/14* (2013.01); *F01N 2470/10* (2013.01); *F01N 2470/20* (2013.01); *F01N 2590/02* (2013.01); *F01N 2590/022* (2013.01); *F02B 75/18* (2013.01); *F02B 2075/1816* (2013.01)

(58) Field of Classification Search

CPC .... F01N 3/046; F01N 13/004; F01N 2470/10; F01N 2470/20; F01N 2590/02; F01N 2590/022; B63H 21/14; B63H 21/383; F02B 75/18; F02B 2075/1816

USPC ..................................................... 60/321, 323

See application file for complete search history.

(56) References Cited

U.S. PATENT DOCUMENTS

| | | | | |
|---|---|---|---|---|
| 8,671,904 B2 * | 3/2014 | D'Anna | F02F 1/243 | 123/193.5 |
| 2004/0050039 A1 * | 3/2004 | Matsuda | F01N 3/046 | 60/322 |
| 2010/0083920 A1 * | 4/2010 | Kuhlbach | F01N 13/107 | 123/193.5 |

(Continued)

FOREIGN PATENT DOCUMENTS

| | | |
|---|---|---|
| JP | H06102972 B2 | 12/1994 |
| JP | H1179092 A | 3/1999 |

(Continued)

*Primary Examiner* — Jorge L Leon, Jr.

(74) *Attorney, Agent, or Firm* — Keating & Bennett, LLP

(57) ABSTRACT

A marine vessel includes a hull, an engine, and an exhaust manifold including four upstream exhaust channels connected to four exhaust ports, respectively, one downstream central exhaust channel defined by two central upstream exhaust channels of the four upstream exhaust channels, two downstream side exhaust channels located downstream of the four upstream exhaust channels in an exhaust flow direction and spaced from and adjacent to the downstream central exhaust channel on both sides of the downstream central exhaust channel, and a water jacket. The water jacket is located in the exhaust manifold such that cooling water flows between the downstream central exhaust channel and the downstream side exhaust channels.

20 Claims, 5 Drawing Sheets

(56) References Cited

U.S. PATENT DOCUMENTS

| | | | | |
|---|---|---|---|---|
| 2012/0227687 | A1* | 9/2012 | Galeazzi .............. | F02F 1/4264<br>123/41.82 R |
| 2020/0080464 | A1 | 3/2020 | Mahira et al. | |

FOREIGN PATENT DOCUMENTS

| | | | |
|---|---|---|---|
| JP | 3798498 | B2 | 7/2006 |
| JP | 4807343 | B2 | 11/2011 |
| JP | 5891943 | B2 | 3/2016 |
| JP | 6790034 | B2 | 11/2020 |

* cited by examiner

VII-VII ARROW VIEW

VIII-VIII CROSS-SECTION

IX-IX CROSS-SECTION

X-X CROSS-SECTION

XI-XI CROSS-SECTION

XII-XII CROSS-SECTION

MARINE VESSEL AND EXHAUST MANIFOLD FOR MARINE VESSEL

CROSS REFERENCE TO RELATED APPLICATIONS

This application claims the benefit of priority to Japanese Patent Application No. 2023-202224 filed on Nov. 29, 2023. The entire contents of this application are hereby incorporated herein by reference.

BACKGROUND OF THE INVENTION

1. Field of the Invention

The present invention relates to marine vessels and exhaust manifolds for marine vessels.

2. Description of the Related Art

A marine vessel including an engine and an exhaust manifold including a water jacket is known in general. Such a marine vessel is disclosed in Japanese Patent Laid-Open No. 11-079092, for example.

Japanese Patent Laid-Open No. 11-079092 discloses a small marine vessel including a four-cylinder engine and an exhaust manifold including a water jacket. The exhaust manifold is cooled by the water jacket in order to reduce or prevent a temperature increase due to an exhaust flow from the engine. Cooling water flows through the water jacket in a direction opposite to an exhaust flow direction and flows into a cylinder head.

Although not clearly described in Japanese Patent Laid-Open No. 11-079092, there is an exhaust manifold in which some of a plurality of exhaust holes are merged at a halfway location before the plurality of exhaust holes are merged into one. In such an exhaust manifold, a large amount of exhaust gas flows into an exhaust hole on the downstream side in the exhaust flow direction defined by the merging of the exhaust holes, and thus the vicinity of the merged exhaust hole particularly tends to become hot. Therefore, in the field of exhaust manifolds installed on engines of small marine vessels, it has been desired to effectively cool the vicinity of an exhaust hole defined by merging a plurality of exhaust holes halfway using a water jacket.

SUMMARY OF THE INVENTION

Example embodiments of the present invention provide marine vessels and exhaust manifolds for marine vessels that each effectively cool vicinities of exhaust channels defined by merging a plurality of exhaust channels using water jackets.

A marine vessel according to an example embodiment of the present invention includes a hull, a four-cylinder engine in or on the hull, and an exhaust manifold connected to the four-cylinder engine. The exhaust manifold includes four upstream exhaust channels connected to four exhaust ports of the four-cylinder engine, respectively, one downstream central exhaust channel located downstream of the four upstream exhaust channels in an exhaust flow direction and defined by two central upstream exhaust channels of the four upstream exhaust channels merged together, two downstream side exhaust channels located downstream of the four upstream exhaust channels in the exhaust flow direction and spaced apart from and adjacent to the downstream central exhaust channel on both sides of the downstream central exhaust channel, and a water jacket extending along the exhaust flow direction to allow cooling water to flow therethrough toward the four-cylinder engine in a direction opposite to the exhaust flow direction. The water jacket is configured such that the cooling water flows between the downstream central exhaust channel and the downstream side exhaust channels.

In a marine vessel according to an example embodiment of the present invention, the exhaust manifold includes the downstream central exhaust channel defined by the two central upstream exhaust channels of the four upstream exhaust channels merged together, the downstream side exhaust channels spaced apart from and adjacent to the downstream central exhaust channel on both sides of the downstream central exhaust channel, and the water jacket extending along the exhaust flow direction to allow the cooling water to flow therethrough toward the engine in the direction opposite to the exhaust flow direction. Furthermore, the water jacket is configured such that the cooling water flows between the downstream central exhaust channel and the downstream side exhaust channels. Accordingly, the water jacket is located between the downstream central exhaust channel and the downstream side exhaust channels into which exhaust gas flows from both of the two central upstream exhaust channels where the temperature is particularly likely to increase. Furthermore, the water jacket is located on opposite sides of the one downstream side exhaust channel and the other downstream side exhaust channel with respect to the downstream central exhaust channel. In other words, the downstream central exhaust channel is interposed between the water jackets. Thus, the water jackets effectively cool the vicinity of the downstream central exhaust channel defined by merging a plurality of upstream exhaust channels.

In a marine vessel according to an example embodiment of the present invention, the exhaust manifold preferably includes a flange including three outlet openings corresponding to the downstream central exhaust channel and the downstream side exhaust channels to allow exhaust gas to flow out therethrough, and the water jacket is preferably located in the flange such that the cooling water flows between the downstream central exhaust channel and the downstream side exhaust channels. Accordingly, the water jacket is located between the downstream central exhaust channel and the downstream side exhaust channels in the flange at the most downstream location in the exhaust flow direction. Therefore, as compared with a case in which the water jacket is not provided in the flange between the downstream central exhaust channel and the downstream side exhaust channels, the exhaust manifold is cooled farther downstream in the exhaust flow direction by the water jacket. Therefore, the vicinity of the downstream central exhaust channel defined by merging the plurality of upstream exhaust channels is more effectively cooled by the water jacket.

In such a case, the three outlet openings are preferably spaced apart from each other on an exhaust outlet surface of the flange at which the three outlet openings are located, and at the exhaust outlet surface the water jacket is preferably not located between the three outlet openings but instead around an outer periphery of the three outlet openings so as to surround the three outlet openings. Accordingly, the three outlet openings are spaced apart from each other at the exhaust outflow surface, and thus as compared with a case in which the three outlet openings are connected to each other, the water jackets are located farther downstream in the exhaust flow direction between the downstream central exhaust channel and the downstream side exhaust channels so as to be closer to the three outlet openings. Moreover, the vicinity of the downstream central exhaust channel is more effectively cooled by the water jackets surrounding the three outlet openings.

In a marine vessel according to an example embodiment of the present invention, the water jacket preferably includes a plurality of water jackets surrounding the downstream central exhaust channel. Accordingly, the vicinity of the downstream central exhaust channel is more effectively cooled by the water jackets surrounding the downstream central exhaust channel.

In a marine vessel according to an example embodiment of the present invention, three outlet openings corresponding to the downstream central exhaust channel and the downstream side exhaust channels to allow exhaust gas to flow out therethrough preferably have the same or substantially the same area. Accordingly, an exhaust flow is uniform among the plurality of exhaust channels such that pulsation and exhaust interference in the plurality of exhaust channels are reduced or prevented.

In such a case, the three outlet openings are preferably aligned linearly in a first direction, and in a second direction perpendicular to both of the first direction and the exhaust flow direction, an outlet opening corresponding to the downstream central exhaust channel preferably has an elongated shape with an opening length larger than an opening length of each of outlet openings corresponding to the downstream side exhaust channels. Accordingly, the downstream central exhaust channel is elongated in the second direction, and thus a larger separation distance is obtained between the downstream central exhaust channel and the downstream side exhaust channels such that the size of the water jacket is able to be further increased.

In a marine vessel in which the outlet opening corresponding to the downstream central exhaust channel has an elongated shape, the outlet openings corresponding to the downstream side exhaust channels preferably have a circular shape, and the outlet opening corresponding to the downstream central exhaust channel preferably has an elongated circular shape extending in the second direction. Accordingly, due to the downstream central exhaust channel having the elongated circular outlet opening extending in the second direction, a larger separation distance is obtained between the downstream central exhaust channel and the downstream side exhaust channels.

In a marine vessel according to an example embodiment of the present invention, the four-cylinder engine is preferably an in-line four-cylinder engine, and the exhaust manifold preferably further includes four inlet openings aligned linearly to allow exhaust gas to flow in therethrough from the in-line four-cylinder engine, and three outlet openings aligned linearly and corresponding to the downstream central exhaust channel and the downstream side exhaust channels to allow the exhaust gas to flow out therethrough. Accordingly, in the exhaust manifold provided on the in-line four-cylinder engine, the vicinity of the downstream central exhaust channel defined by the plurality of upstream exhaust channels merged together is effectively cooled by the water jacket.

In such a case, a direction in which the four inlet openings are aligned is preferably the same as a direction in which the three outlet openings are aligned. Accordingly, as compared with a case in which the direction in which the four inlet openings are aligned intersects with the direction in which the three outlet openings are aligned, the size of the exhaust manifold in a direction perpendicular to the direction in which the four inlet openings are aligned is reduced.

In a marine vessel according to an example embodiment of the present invention, between the downstream central exhaust channel and the downstream side exhaust channels, a width of the water jacket in a direction in which the downstream central exhaust channel and the downstream side exhaust channels are aligned is preferably larger than a thickness of a portion of the exhaust manifold between the downstream central exhaust channel and the downstream side exhaust channels. Accordingly, between the downstream central exhaust channel and the downstream side exhaust channels, the water jacket has a relatively large width.

In a marine vessel according to an example embodiment of the present invention, a minimum separation distance between the downstream central exhaust channel and the downstream side exhaust channels is preferably about 10 mm or more, for example. Accordingly, between the downstream central exhaust channel and the downstream side exhaust channels, an excessive decrease in the thickness of the exhaust manifold and an excessive decrease in the width of the water jacket are reduced or prevented.

In a marine vessel according to an example embodiment of the present invention, the four-cylinder engine is preferably provided in the hull, and the marine vessel preferably further includes a jet propulsion device including the four-cylinder engine and an impeller driven by the four-cylinder engine to generate a water flow and a propulsive force by the water flow. Accordingly, in a jet propulsion watercraft on which a relatively high-output engine that is likely to become hot is mounted, the vicinity of the downstream central exhaust channel defined by merging the plurality of upstream exhaust channels is effectively cooled by the water jacket.

An exhaust manifold for a marine vessel according to an example embodiment of the present invention includes four upstream exhaust channels connected to four exhaust ports of a four-cylinder engine in or on the marine vessel, respectively, one downstream central exhaust channel located downstream of the four upstream exhaust channels in an exhaust flow direction and defined by merging two central upstream exhaust channels of the four upstream exhaust channels, two downstream side exhaust channels located downstream of the four upstream exhaust channels in the exhaust flow direction and spaced apart from and adjacent to the downstream central exhaust channel on both sides of the downstream central exhaust channel, and a water jacket extending along the exhaust flow direction to allow cooling water to flow therethrough toward the four-cylinder engine in a direction opposite to the exhaust flow direction. The water jacket is configured such that the cooling water flows between the downstream central exhaust channel and the downstream side exhaust channels.

An exhaust manifold for a marine vessel according to an example embodiment of the present invention includes the downstream central exhaust channel defined by merging the two central upstream exhaust channels of the four upstream exhaust channels, the downstream side exhaust channels spaced apart from and adjacent to the downstream central exhaust channel on both sides of the downstream central exhaust channel, and the water jacket extending along the exhaust flow direction to allow the cooling water to flow therethrough toward the engine in the direction opposite to the exhaust flow direction. Furthermore, the water jacket is provided in the exhaust manifold such that the cooling water flows between the downstream central exhaust channel and the downstream side exhaust channels. Accordingly, the water jacket is located between the downstream central exhaust channel and the downstream side exhaust channels and into which exhaust gas flows from both of the two central upstream exhaust channels where the temperature is particularly likely to increase. Furthermore, the water jacket is located on each of opposite sides of one downstream side exhaust channel and the other downstream side exhaust channel with respect to the downstream central exhaust channel. In other words, the downstream central exhaust channel is interposed between the water jackets. Thus, the water jackets effectively cool the vicinity of the downstream central exhaust channel defined by merging a plurality of upstream exhaust channels.

An exhaust manifold for a marine vessel according to an example embodiment of the present invention preferably further includes a flange including three outlet openings corresponding to the downstream central exhaust channel and the downstream side exhaust channels to allow exhaust gas to flow out therethrough, and the water jacket is preferably located in the flange such that the cooling water flows between the downstream central exhaust channel and the downstream side exhaust channels. Accordingly, the water jacket is located between the downstream central exhaust channel and the downstream side exhaust channels in the flange located at the most downstream location in the exhaust flow direction. Therefore, as compared with a case in which the water jacket is not provided in the flange between the downstream central exhaust channel and the downstream side exhaust channels, the exhaust manifold is cooled farther downstream in the exhaust flow direction by the water jacket. Therefore, the vicinity of the downstream central exhaust channel defined by merging the plurality of upstream exhaust channels is more effectively cooled by the water jacket.

In such a case, the three outlet openings are preferably spaced apart from each other on an exhaust outlet surface of the flange on which the three outlet openings are located, and at the exhaust outlet surface, the water jacket is preferably not provided between the three outlet openings but instead around an outer periphery of the three outlet openings so as to surround the three outlet openings. Accordingly, the three outlet openings are spaced apart from each other on the exhaust outflow surface, and thus as compared with a case in which the three outlet openings are connected to each other, the water jackets are located farther downstream in the exhaust flow direction between the downstream central exhaust channel and the downstream side exhaust channels so as to be closer to the three outlet openings. Moreover, the vicinity of the downstream central exhaust channel is more effectively cooled by the water jackets surrounding the three outlet openings.

In an exhaust manifold for a marine vessel according to an example embodiment of the present invention, the water jacket preferably includes a plurality of water jackets surrounding the downstream central exhaust channel. Accordingly, the vicinity of the downstream central exhaust channel is more effectively cooled by the water jackets surrounding the downstream central exhaust channel.

In an exhaust manifold for a marine vessel according to an example embodiment of the present invention, three outlet openings corresponding to the downstream central exhaust channel and the downstream side exhaust channels to allow exhaust gas to flow out therethrough preferably have the same or substantially the same area. Accordingly, an exhaust flow is uniform among the plurality of exhaust channels such that pulsation and exhaust interference in the plurality of exhaust channels are reduced or prevented.

In such a case, the three outlet openings are preferably aligned linearly in a first direction, and in a second direction perpendicular to both of the first direction and the exhaust flow direction, an outlet opening corresponding to the downstream central exhaust channel preferably has an elongated shape with an opening length larger than an opening length of each of outlet openings corresponding to the downstream side exhaust channels. Accordingly, the downstream central exhaust channel is elongated in the second direction, and thus a larger separation distance is obtained between the downstream central exhaust channel and the downstream side exhaust channels such that the size of the water jacket is able to be further increased.

In an exhaust manifold for a marine vessel in which the outlet opening corresponding to the downstream central exhaust channel has an elongated shape, the outlet openings corresponding to the downstream side exhaust channels preferably have a circular shape, and the outlet opening corresponding to the downstream central exhaust channel preferably has an elongated circular shape extending in the second direction. Accordingly, due to the downstream central exhaust channel having the elongated circular outlet opening extending in the second direction, a larger separation distance is obtained between the downstream central exhaust channel and the downstream side exhaust channels.

In an exhaust manifold for a marine vessel according to an example embodiment of the present invention, the four-cylinder engine is preferably an in-line four-cylinder engine, and the exhaust manifold preferably further includes four inlet openings aligned linearly to allow exhaust gas to flow in therethrough from the in-line four-cylinder engine, and three outlet openings aligned linearly and corresponding to the downstream central exhaust channel and the downstream side exhaust channels to allow the exhaust gas to flow out therethrough. Accordingly, in the exhaust manifold connected to the in-line four-cylinder engine, the vicinity of the downstream central exhaust channel defined by merging the plurality of upstream exhaust channels is effectively cooled by the water jacket.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention are hereinafter described with reference to the drawings.

The structure of a small marine vessel 100 including an exhaust manifold 103 is now described with reference to FIGS. 1 to 12.

Figure 1:
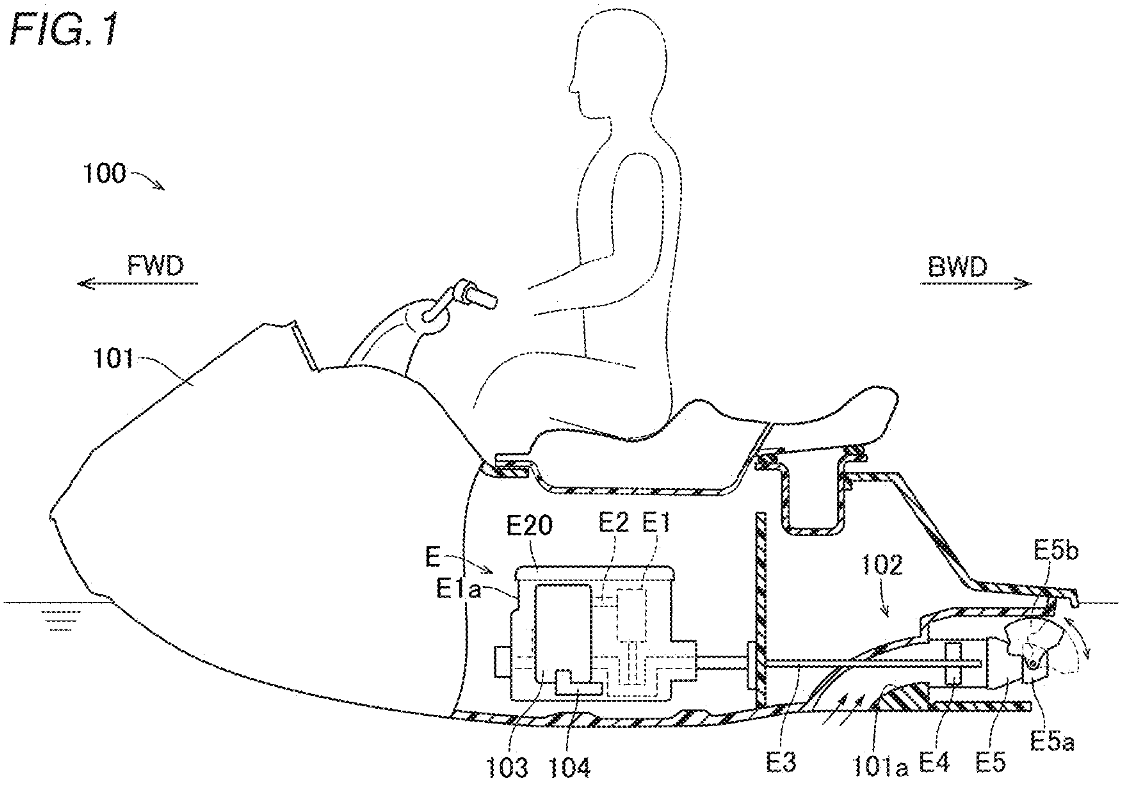
FIG. 1 is a side view showing the overall structure of a small marine vessel according to an example embodiment of the present invention.

As shown in FIG. 1, the small marine vessel 100 may be a so-called personal watercraft. The personal watercraft includes a relatively small hull 101 and travels on water by jetting water to obtain a thrust to move the hull 101.

The small marine vessel 100 includes the hull 101 and a jet propulsion device 102. The jet propulsion device 102 includes a four-cylinder engine E and an impeller E4 provided in the hull 101. The jet propulsion device 102 drives the impeller E4 with the engine E to generate a water flow. The jet propulsion device 102 generates a propulsive force to propel the hull 101 by the water flow. The engine E is, for example, an in-line four-cylinder engine in which four cylinders E1 are arranged in line. Therefore, in the engine E, exhaust ports E2 connected to the four cylinders E1 are also arranged in line so as to be aligned in the same direction as the four cylinders E1.

The small marine vessel 100 also includes the exhaust manifold 103 provided on the engine E, and a collecting pipe 104.

In the figures, arrow FWD represents the forward movement direction of the small marine vessel 100, arrow BWD represents the reverse movement direction of the small marine vessel 100, an A (first) direction represents a direction in which four exhaust ports E2 are aligned, and a B (second) direction represents a predetermined direction perpendicular to the A direction.

An exhaust outlet surface 40 of a flange 4 (described below) of the exhaust manifold 103 is a flat surface extending in the A direction and the B direction (see FIG. 7) and contacts the collecting pipe 104. Exhaust gas flows from the exhaust manifold 103 to the collecting pipe 104 via the exhaust outlet surface 40. In addition, cooling water flows from the collecting pipe 104 to the exhaust manifold 103 via the exhaust outlet surface 40.

As shown in FIG. 1, the jet propulsion device 102 includes the engine E to which a drive shaft E3 extending in a forward-rearward direction is connected, the impeller E4 fixed to a rear end of the drive shaft E3, a nozzle E5, a deflector E5*a*, and a reverse gate E5*b* (bucket).

Figure 2:
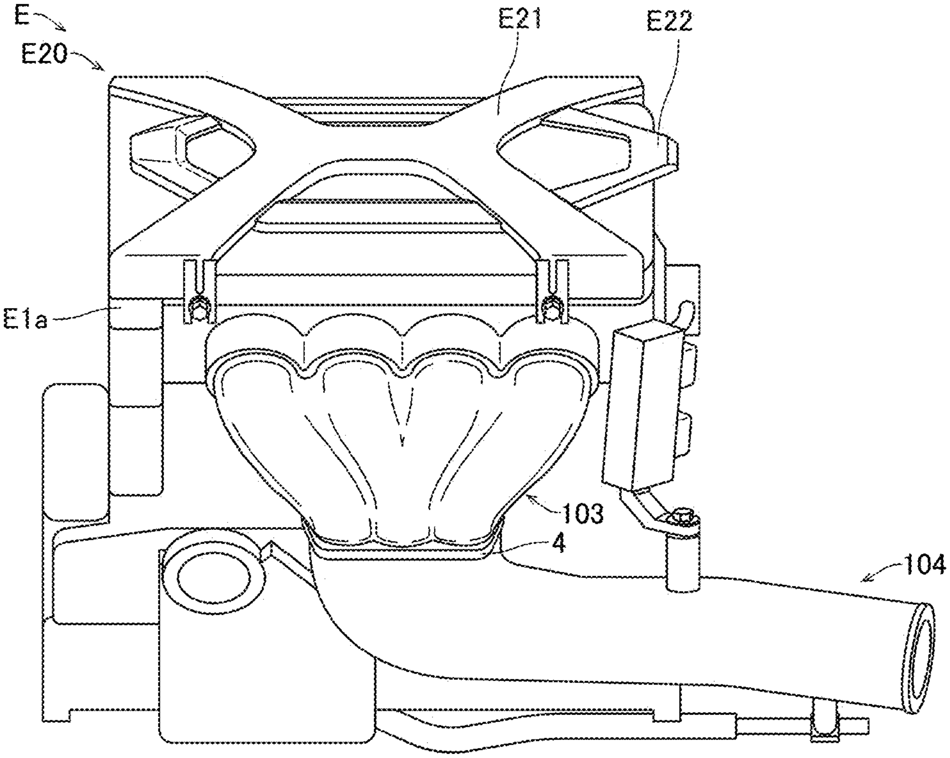
FIG. 2 is a perspective view showing an engine, an exhaust manifold, and a collecting pipe of a small marine vessel according to an example embodiment of the present invention.
Figure 3:
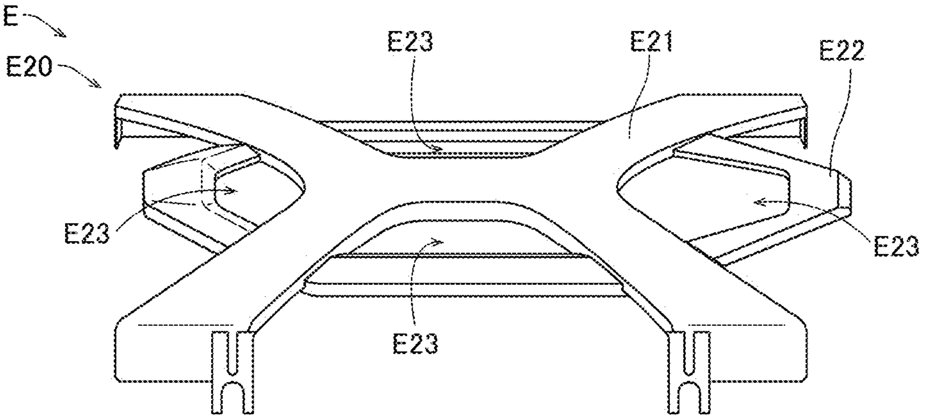
FIG. 3 is a perspective view showing a cover for an engine of a small marine vessel according to an example embodiment of the present invention.

As shown in FIGS. 2 and 3, the engine E includes a cover E20 on an upper portion of a cylinder head Ela. The cover E20 includes a first housing E21 having, for example, an X shape and a second housing E22 having an annular polygonal shape (e.g., hexagonal shape) combined with each other in a plan view (when the engine E is viewed from above). In the plan view, the center position of the first housing E21 having an X shape and the center position of the second housing E22 having the annular polygonal shape are the same or substantially the same. The first housing E21 having the X shape protrudes upward relative to the second housing E22 having the annular polygonal shape. Therefore, the second housing E22 having the annular polygonal shape is divided into a plurality of portions (four portions) by the first housing E21 having the X shape in the plan view. A plurality of (four) gaps E23 (through-holes) are provided inside the second housing E22 having the annular polygonal shape and between the first housing E21 having the X shape and the second housing E22 having the annular polygonal shape. As an example, the first housing E21 and the second housing E22 are made of a plant-derived cellulose nanofiber (CNF) reinforced resin. The plant-derived cellulose nanofiber reinforced resin is a high-strength material produced by kneading and dispersing plant-derived cellulose nanofiber, which is a biomass material using ligneous resources, into a resin such as polypropylene. The first housing and the second housing may be made of another material. Alternatively, the first housing and the second housing may be made of different materials.

Referring again to FIG. 1, the hull 101 includes a water passage 101*a* extending from an opening at the bottom of the hull 101 to an opening at the rear of the hull 101. The impeller E4 is located in the water passage 101*a*. When the impeller E4 is driven, water is taken from the opening at the bottom of the hull 101 into the water passage 101*a*.

The drive shaft E3 extends in the forward-rearward direction and rotates about a central axis extending in the forward-rearward direction by a crankshaft of the engine E.

The impeller E4 rotates together with the drive shaft E3 to generate a flow toward the nozzle E5 on the rear side within the water passage 101*a*.

The nozzle E5 is located at the most downstream location on the rear side in the water passage 101*a* in which the impeller E4 is located. The nozzle E5 functions as a water outlet (jetting port). That is, the nozzle E5 ejects water to generate a propulsive force. The deflector E5*a* and the reverse gate E5*b* are provided on the nozzle E5.

The deflector E5*a* is rotatable in a right-left direction about an axis extending in an upward-downward direction. That is, the deflector E5*a* is operable to change the direction of the water ejected from the nozzle E5 in the right-left direction. The reverse gate E5*b* is rotatable in the upward-downward direction about an axis extending in the right-left direction. That is, the reverse gate E5*b* is operable to change the direction of the water ejected from the nozzle E5 in the upward-downward direction.

Figure 4:
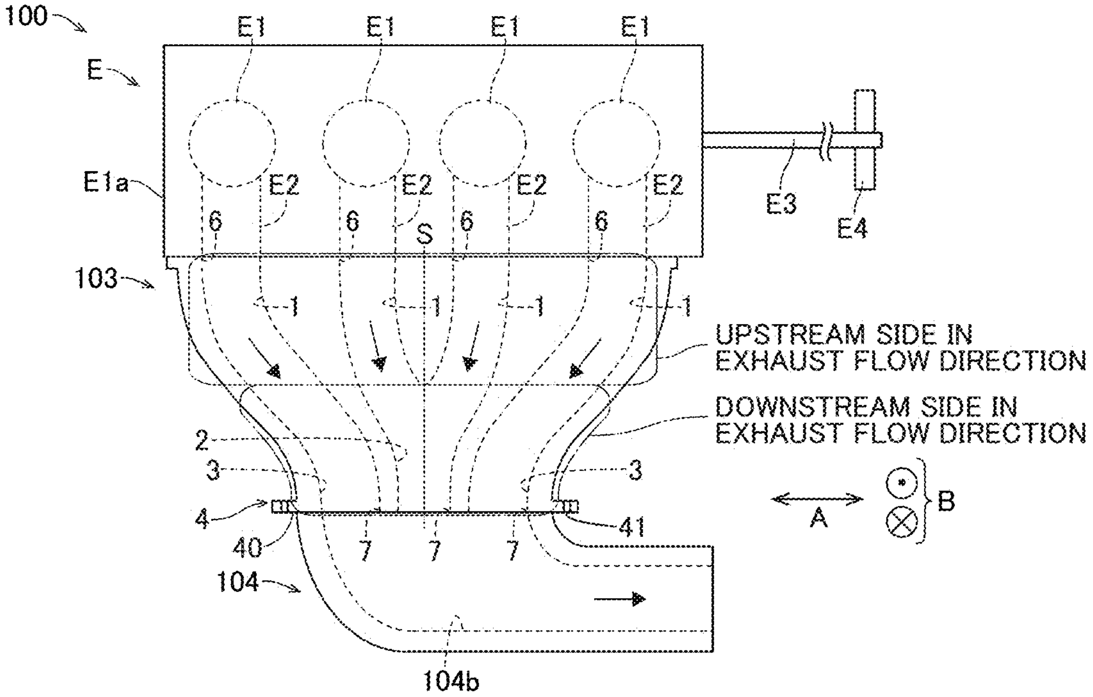
FIG. 4 is a schematic view of an engine, an exhaust manifold, and a collecting pipe of a small marine vessel according to an example embodiment of the present invention.
Figure 5:
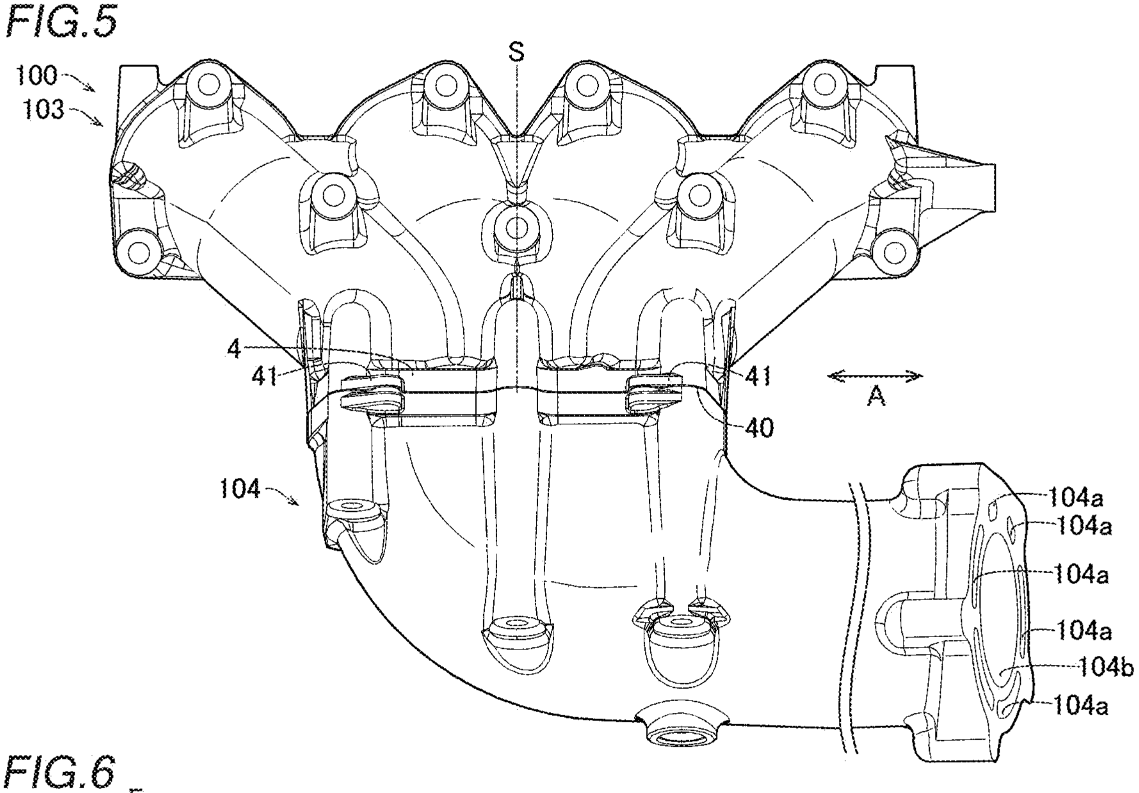
FIG. 5 is a front view showing an exhaust manifold and a collecting pipe of a small marine vessel according to an example embodiment of the present invention.

The collecting pipe 104 shown in FIGS. 4 and 5 is connected to the exhaust manifold 103 from the downstream side in an exhaust flow direction. Specifically, the collecting pipe 104 is fixed to the flange 4 (described below) of the exhaust manifold 103 by a fastener. The fastener may be a bolt and a nut, for example.

The collecting pipe 104 includes one collecting hole 104*b* through which the exhaust gas passes. The collecting hole 104*b* collects the exhaust gas flowing from one downstream central exhaust channel 2 (described below) and two downstream side exhaust channels 3 (described below) of the exhaust manifold 103 into one flow.

The collecting pipe 104 also includes a plurality of cooling water passages 104*a*. The cooling water passages

104*a* are arranged around the collecting hole 104*b* and extend along the exhaust flow direction of the collecting hole 104*b*. The flow direction of cooling water flowing through the cooling water passages 104*a* is opposite to the flow direction of the exhaust gas passing through the collecting hole 104*b*.

The cooling water passages 104*a* supply cooling water to the exhaust manifold 103 via the exhaust outlet surface 40 of the flange 4. The small marine vessel 100 includes a cooling water pump (not shown) to pump cooling water from outside the small marine vessel 100. The small marine vessel 100 supplies the pumped cooling water from the collecting pipe 104 through the exhaust manifold 103 to the cylinder head Ela of the engine E. That is, the cooling water pumped by the cooling water pump flows through the cooling water passages 104*a* of the collecting pipe 104, water jackets 5 (described below) of the exhaust manifold 103, and a cooling water passage E10 (see FIG. 6) in the cylinder head Ela in this order.

The exhaust manifold 103 shown in FIGS. 4 and 5 is symmetrical or substantially symmetrical with respect to a symmetry plane S extending in a direction perpendicular to the A direction. The exhaust manifold 103 is fixed to the cylinder head Ela of the engine E. The exhaust manifold 103 is located between the cylinder head Ela and the collecting pipe 104. Exhaust gas generated in the cylinders E1 of the engine E flows through the exhaust ports E2 of the cylinder head Ela, the exhaust manifold 103, and the collecting pipe 104 in this order.

The exhaust manifold 103 includes four upstream exhaust channels 1, one downstream central exhaust channel 2, two downstream side or end exhaust channels 3, the flange 4, and water jackets 5.

The exhaust manifold 103 also includes four inlet openings 6 corresponding to the four upstream exhaust channels 1, through which exhaust gas flows in, and three outlet openings 7 corresponding to the downstream central exhaust channel 2 and the two downstream side exhaust channels 3, through which exhaust gas flows out.

In short, the inlet openings 6 are adjacent to the upstream ends of the four upstream exhaust channels 1 in the exhaust flow direction, and are openings through which exhaust gas flows into the exhaust manifold 103 from the engine E. The outlet openings 7 are at the downstream ends of the downstream central exhaust channel 2 and the two downstream side exhaust channels 3 in the exhaust flow direction, and are openings through which exhaust gas flows out from the exhaust manifold 103 to the collecting pipe 104.

The four upstream exhaust channels 1 are connected to the four exhaust ports E2 of the four-cylinder engine E, respectively. The four inlet openings 6 adjacent to the upstream ends of the four upstream exhaust channels 1 are aligned linearly in the A direction. The four inlet openings 6 are spaced apart from each other at the same or substantially the same intervals in the A direction. The four upstream exhaust channels 1 are closer to each other toward the downstream side in the exhaust flow direction.

That is, intervals between the four upstream exhaust channels 1 in the A direction gradually decrease toward the downstream side in the exhaust flow direction. The four upstream exhaust channels 1 are closer to the center position (symmetry plane S) of the exhaust manifold 103 in the A direction toward the downstream side in the exhaust flow direction.

The cross-sections of the four upstream exhaust channels 1 perpendicular to the exhaust flow direction include arcuate surfaces. Specifically, the cross-sections of the four upstream exhaust channels 1 perpendicular to the exhaust flow direction are circular or substantially circular.

As shown in FIG. 4, the downstream central exhaust channel 2 is located downstream of the four upstream exhaust channels 1 in the exhaust flow direction, and is defined by merging two central upstream exhaust channels 1 of the four upstream exhaust channels 1.

Therefore, the downstream central exhaust channel 2 is connected to the two central upstream exhaust channels 1 from the downstream side in the exhaust flow direction. An exhaust channel connecting the downstream central exhaust channel 2 to the two central upstream exhaust channels 1 has a Y-shape. The downstream central exhaust channel 2 is located at the center position (symmetry plane S) of the exhaust manifold 103 in the A direction.

Figure 8:
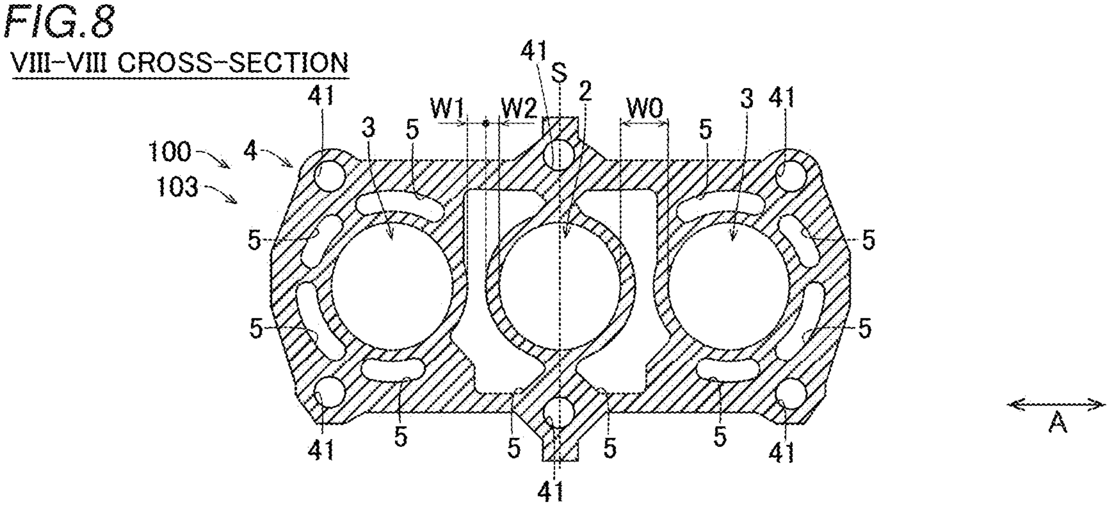
FIG. 8 is a sectional view of an exhaust manifold taken along the line VIII-VIII in FIG. 6.

The cross-section of the downstream central exhaust channel 2 perpendicular to the exhaust flow direction includes an arcate surface (see FIG. 8).

The two downstream side exhaust channels 3 are configured as a pair. The two downstream side exhaust channels 3 are located downstream of the four upstream exhaust channels 1 in the exhaust flow direction, and are adjacent to the downstream central exhaust channel 2 on both sides of the downstream central exhaust channel 2 in the A direction. That is, the downstream central exhaust channel 2 is interposed between the two downstream side exhaust channels 3 in the A direction.

Thus, one downstream side exhaust channel 3 and the other downstream side exhaust channel 3 in the A direction are connected to an upstream exhaust channel 1 at a first end in the A direction and an upstream exhaust channel 1 at a second end in the A direction, respectively, from the downstream side in the exhaust flow direction. Each of the two downstream side exhaust channels 3 has an S-shape. The two downstream side exhaust channels 3 are symmetrical or substantially symmetrical with respect to the center position (symmetry plane S) of the exhaust manifold 103 in the A direction.

The cross-sections of the two downstream side exhaust channels 3 perpendicular to the exhaust flow direction include arcuate surfaces. Specifically, the cross-sections of the two downstream side exhaust channels 3 perpendicular to the exhaust flow direction are circular or substantially circular.

The three outlet openings 7 are aligned linearly in the A direction. Therefore, a direction in which the four inlet openings 6 are aligned is the same as a direction in which the three outlet openings 7 are aligned. The three outlet openings 7 of the flange 4 are spaced apart from each other at the exhaust outlet surface 40 on which the three outlet openings 7 are located. Specifically, the three outlet openings 7 are spaced apart from each other at the same or substantially the same intervals in the A direction. A minimum separation distance W0 (see FIG. 8) between the downstream central exhaust channel 2 and the downstream side exhaust channels 3 is, for example, about 10 mm or more.

Figure 7:
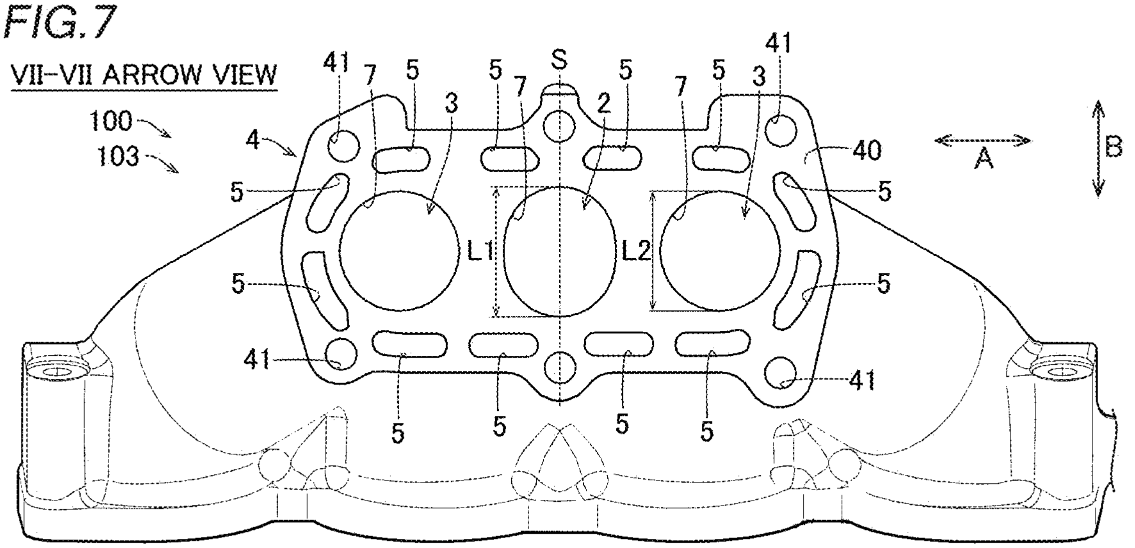
FIG. 7 is an arrow view of an exhaust manifold taken along the line VII-VII in FIG. 6.

The three outlet openings 7 shown in FIG. 7 have the same or substantially the same area. Two outlet openings 7 corresponding to the two downstream side exhaust channels 3 have the same shape. The two outlet openings 7 corresponding to the two downstream side exhaust channels 3 and one outlet opening 7 corresponding to the downstream central exhaust channel 2 have different shapes.

The outlet opening 7 corresponding to the downstream central exhaust channel 2 has a vertically elongated and narrow shape. Specifically, in a perpendicular direction (B direction) perpendicular to both of the direction (A direction) in which the three outlet openings 7 are aligned and the exhaust flow direction in which exhaust gas passes through the three outlet openings 7, the outlet opening 7 corresponding to the downstream central exhaust channel 2 has an elongated shape with an opening length L1 larger than the opening length L2 of the outlet opening 7 corresponding to each of the downstream side exhaust channels 3.

Specifically, the outlet openings 7 corresponding to the downstream side exhaust channels 3 have a circular shape. Moreover, the outlet opening 7 corresponding to the downstream central exhaust channel 2 has an elongated circular shape elongated in the perpendicular direction (B direction). Therefore, the width (the length in the A direction) of the outlet opening 7 corresponding to the downstream central exhaust channel 2 is smaller than the width (the length in the A direction) of the outlet opening 7 of each of the downstream side exhaust channels 3.

The flange 4 is located at the most downstream location of the exhaust manifold 103 in the exhaust flow direction. The flange 4 includes a plurality of fastener mounts 41 to mount fasteners, such as bolts. The plurality of fastener mounts 41 are located around the downstream central exhaust channel 2 and the two downstream side exhaust channels 3. The fastener mounts 41 include holes through which the bolts are inserted. The flange 4 includes the three outlet openings 7 corresponding to the downstream central exhaust channel 2 and the two downstream side exhaust channels 3, through which exhaust gas flows out.

Figure 6:
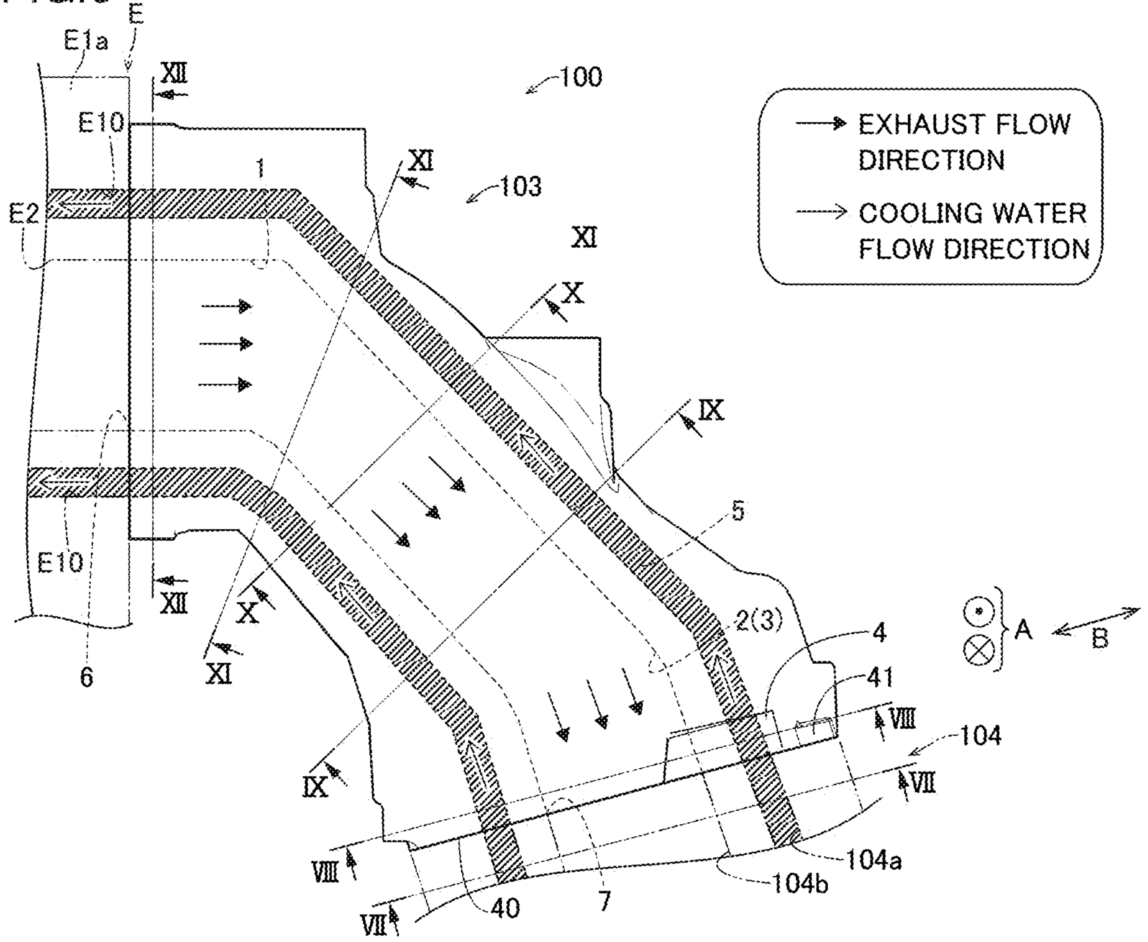
FIG. 6 is a side view showing an engine, an exhaust manifold, and a collecting pipe of a small marine vessel according to an example embodiment of the present invention.

The water jackets 5 are described with reference to FIGS. 6 to 12. As shown in FIG. 6, the water jackets 5 extend along the exhaust flow direction. The exhaust flow direction is opposite to the flow direction of the cooling water flowing through the water jackets 5. That is, the cooling water flows through the water jackets 5 in a direction opposite to the exhaust flow direction toward the engine E.

As shown in FIG. 8, in an example embodiment of the present invention, the water jackets 5 are provided in the exhaust manifold 103 such that the cooling water flows between the downstream central exhaust channel 2 and the downstream side exhaust channels 3.

That is, the water jackets 5 are provided between the adjacent exhaust channels (the downstream central exhaust channel 2 and the downstream side exhaust channels 3) at a location closer to the collecting pipe 104 than the engine E. In short, the water jackets 5 are provided between the adjacent exhaust channels on the downstream side of the exhaust manifold 103 in the exhaust flow direction.

Specifically, the water jackets 5 are provided in the flange 4 such that the cooling water flows between the downstream central exhaust channel 2 and the downstream side exhaust channels 3. That is, the water jackets 5 are provided in the exhaust manifold 103 such that the cooling water flows between the downstream central exhaust channel 2 and the downstream side exhaust channels 3 in the vicinity of the exhaust outlet surface 40 of the flange 4.

As shown in FIG. 7, at the exhaust outlet surface 40 of the flange 4, the water jackets 5 are not provided between the three outlet openings 7 but around an outer periphery of the three outlet openings 7 so as to surround the three outlet openings 7. At the exhaust outlet surface 40, the plurality of water jackets 5 are aligned along an annular path that extends in an elongated manner in the A direction so as to surround the three outlet openings 7.

In short, the water jackets 5 between the downstream central exhaust channel 2 and the downstream side exhaust channels 3 are not provided over the entire thickness of the flange 4. The water jackets 5 between the downstream central exhaust channel 2 and the downstream side exhaust channels 3 are provided in the flange 4 only on the side opposite to the exhaust outlet surface 40 of the flange 4 in the thickness direction.

As shown in FIG. 8, the width W1 of the water jacket 5 between the downstream central exhaust channel 2 and the downstream side exhaust channels 3 in a direction (A direction) in which the downstream central exhaust channel 2 and the downstream side exhaust channels 3 are aligned is larger than the thickness W2 of a portion of the exhaust manifold 103 between each of the downstream central exhaust channel 2 and the downstream side exhaust channels 3. Between the downstream central exhaust channel 2 and the downstream side exhaust channels 3, the water jacket 5 is larger than at least the minimum thickness of the portion of the exhaust manifold 103 that defines each of the downstream central exhaust channel 2 and the downstream side exhaust channels 3.

Figure 9:
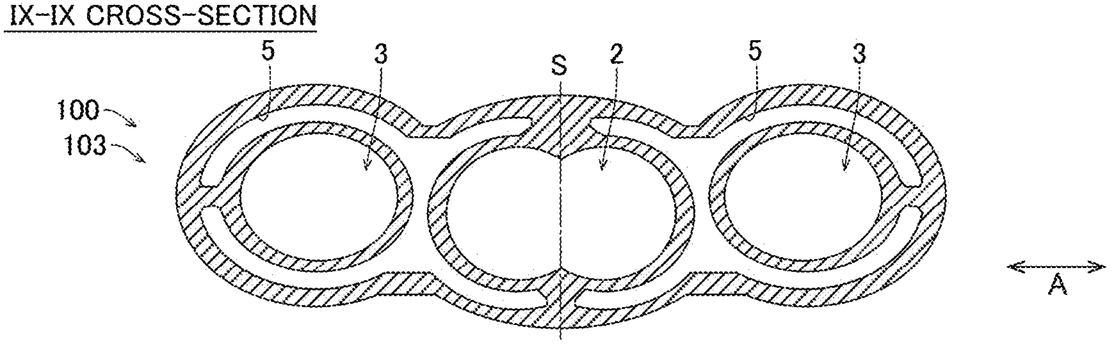
FIG. 9 is a sectional view of an exhaust manifold taken along the line IX-IX in FIG. 6.

As shown in FIGS. 8 and 9, a plurality of water jackets 5 are arranged around the downstream central exhaust channel 2 so as to surround the downstream central exhaust channel 2. Specifically, one water jacket 5 is arranged around the downstream central exhaust channel 2 on each of a first side and a second side of the downstream central exhaust channel 2 in the A direction. As shown in FIG. 8, the water jackets 5 are larger than the downstream central exhaust channel 2 in the direction perpendicular to the A direction.

The water jackets 5 extend along the shape of the downstream central exhaust channel 2 and the shapes of the downstream side exhaust channels 3. Specifically, the water jackets 5 include arcuate (arc-shaped) surfaces that extend along the shape of the downstream central exhaust channel 2 and the shapes of the downstream side exhaust channels 3.

As shown in FIGS. 7 and 8, the cross-sectional shape of the downstream central exhaust channel 2 gradually changes from an elongated circular shape to a circular shape from the outlet opening 7 toward the upstream side in the exhaust flow direction while the area of the cross-sectional shape is maintained. The "cross-sectional shape" refers to the shape of a cross-section perpendicular to the exhaust flow direction.

As shown in FIGS. 7 to 9, the water jackets 5 on the surface (the exhaust outlet surface 40 or the cross-section) on which the downstream central exhaust channel 2 is present merge with each other and decrease in number from the outlet opening 7 toward the upstream side in the exhaust flow direction.

Figure 10:
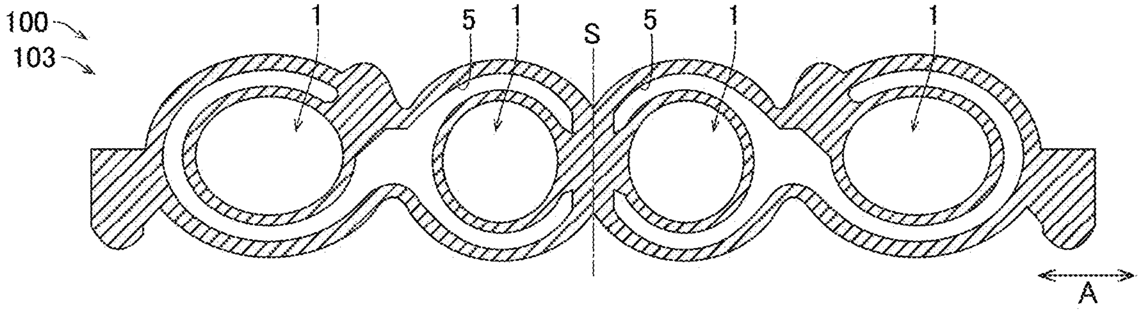
FIG. 10 is a sectional view of an exhaust manifold taken along the line X-X in FIG. 6.
Figure 11:
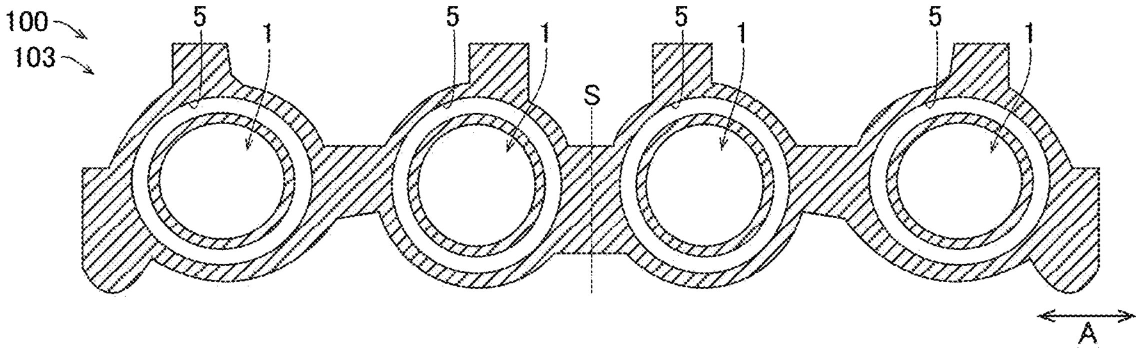
FIG. 11 is a sectional view of an exhaust manifold taken along the line XI-XI in FIG. 6.
Figure 12:
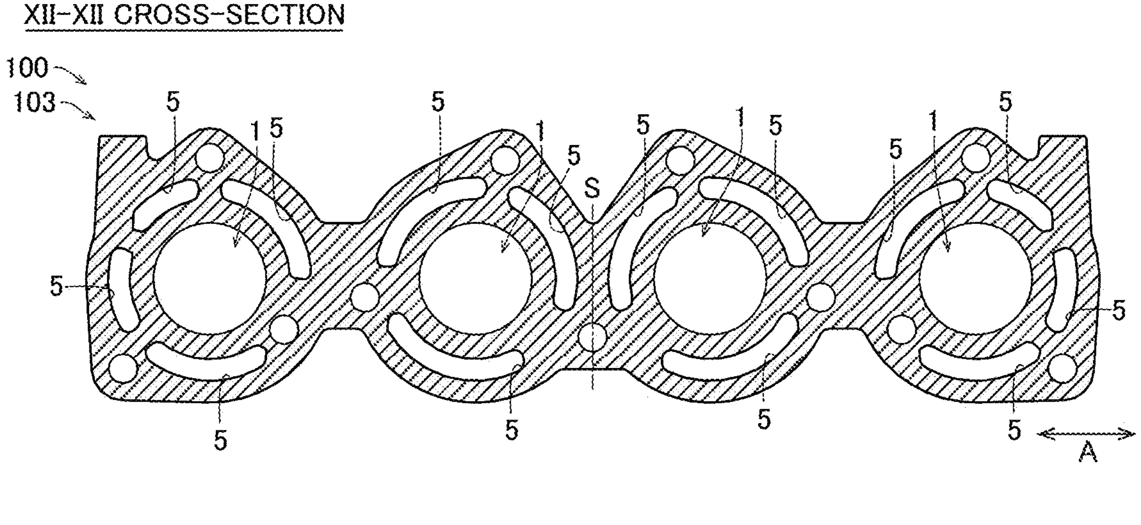
FIG. 12 is a sectional view of an exhaust manifold taken along the line XII-XII in FIG. 6.

As shown in FIGS. 10 to 12, the water jackets 5 in the cross-section in which the upstream exhaust channels 1 are present branch and increase in number toward the upstream side in the exhaust flow direction. As shown in FIG. 11, at halfway locations of the upstream exhaust channels 1 that are relatively close to the engine E in the exhaust flow direction, there are four water jackets 5 that have annular shapes surrounding the four upstream exhaust channels 1, respectively.

According to the various example embodiments of the present invention described above, the following advantageous effects are achieved.

According to an example embodiment of the present invention, the exhaust manifold 103 includes one downstream central exhaust channel 2 defined by merging the two central upstream exhaust channels 1 of the four upstream exhaust channels 1, the two downstream side exhaust channels 3 adjacent to the downstream central exhaust channel 2 on both sides of the downstream central exhaust channel 2, and the water jackets 5 extending along the exhaust flow direction to allow cooling water to flow therethrough toward the engine E in the direction opposite to the exhaust flow direction. The water jackets 5 are provided in the exhaust manifold 103 such that the cooling water flows between the downstream central exhaust channel 2 and the two downstream side exhaust channels 3. Accordingly, the water jackets 5 are provided at locations between the downstream central exhaust channel 2 and the downstream side exhaust channels 3, adjacent to the downstream central exhaust channel 2 and the downstream side exhaust channels 3, and into which exhaust gas flows from both of the two central upstream exhaust channels 1 where the temperature is particularly likely to increase. Furthermore, the water jackets 5 are provided on opposite sides of the one downstream side exhaust channel 3 and the other downstream side exhaust channel 3 with respect to the downstream central exhaust channel 2. In other words, the downstream central exhaust channel 2 is interposed between the water jackets 5. Thus, the water jackets 5 effectively cool the vicinity of the downstream central exhaust channel 2 defined by merging the plurality of upstream exhaust channels 1.

According to an example embodiment of the present invention, the exhaust manifold 103 includes the flange 4 including the three outlet openings 7 corresponding to the downstream central exhaust channel 2 and the two downstream side exhaust channels 3 to allow exhaust gas to flow out therethrough, and the water jackets 5 are provided in the flange 4 such that cooling water flows between the downstream central exhaust channel 2 and the downstream side exhaust channels 3. Accordingly, the water jackets 5 are provided between the downstream central exhaust channel 2 and the downstream side exhaust channels 3 in the flange 4 located at the most downstream location in the exhaust flow direction. Therefore, as compared with a case in which the water jackets are not provided in the flange between the downstream central exhaust channel and the downstream side exhaust channels, the exhaust manifold 103 is cooled farther downstream in the exhaust flow direction by the water jackets 5. Therefore, the vicinity of the downstream central exhaust channel 2 defined by merging the plurality of upstream exhaust channels 1 is more effectively cooled by the water jackets 5.

According to an example embodiment of the present invention, the three outlet openings 7 are spaced apart from each other at the exhaust outlet surface 40 of the flange 4, the water jackets 5 are not provided between the three outlet openings 7, but the water jackets 5 are arranged around the three outlet openings 7 so as to surround the three outlet openings 7. Accordingly, the three outlet openings 7 are spaced apart from each other on the exhaust outflow surface 40, and thus as compared with a case in which the three outlet openings are connected to each other, the water jackets 5 are provided farther downstream in the exhaust flow direction at the locations between the downstream central exhaust channel 2 and the downstream side exhaust channels 3 so as to be closer to the three outlet openings 7. Moreover, the vicinity of the downstream central exhaust channel 2 is more effectively cooled by the water jackets 5 surrounding the three outlet openings 7.

According to an example embodiment of the present invention, a plurality of the water jackets 5 are arranged around the downstream central exhaust channel 2 so as to surround the downstream central exhaust channel 2. Accordingly, the vicinity of the downstream central exhaust channel 2 is more effectively cooled by the water jackets 5 surrounding the downstream central exhaust channel 2.

According to an example embodiment of the present invention, the three outlet openings 7 corresponding to the downstream central exhaust channel 2 and the two downstream side exhaust channels 3 allow exhaust gas to flow out therethrough and have the same or substantially the same area. Accordingly, an exhaust flow is uniform among the plurality of exhaust channels such that pulsation and exhaust interference in the plurality of exhaust channels are reduced or prevented.

According to an example embodiment of the present invention, the three outlet openings 7 are aligned linearly, and in the direction (B direction) perpendicular to both of the direction in which the three outlet openings 7 are aligned and the exhaust flow direction in which exhaust gas passes through the three outlet openings 7, the outlet opening 7 corresponding to the downstream central exhaust channel 2 has an elongated shape with the opening length L1 larger than the opening length L2 of each of the outlet openings 7 corresponding to the downstream side exhaust channels 3. Accordingly, the downstream central exhaust channel 2 is elongated in the B direction, and thus a larger separation distance is obtained between the downstream central exhaust channel 2 and the downstream side exhaust channels 3 such that the sizes of the water jackets 5 are able to be further increased.

According to an example embodiment of the present invention, the outlet openings 7 corresponding to the downstream side exhaust channels 3 have a circular shape, and the outlet opening 7 corresponding to the downstream central exhaust channel 2 has an elongated circular shape extending in the B direction. Accordingly, due to the downstream central exhaust channel 2 having the elongated circular outlet opening 7 extending in the B direction, a larger separation distance is obtained between the downstream central exhaust channel 2 and the downstream side exhaust channels 3.

According to an example embodiment of the present invention, the engine E is preferably an in-line four-cylinder engine E, and the exhaust manifold 103 further includes the four inlet openings 6 aligned linearly to allow exhaust gas to flow in therethrough from the in-line four-cylinder engine E, and the three outlet openings 7 corresponding to the downstream central exhaust channel 2 and the two downstream side exhaust channels 3 are aligned linearly to allow the exhaust gas to flow out therethrough. Accordingly, in the exhaust manifold 103 provided on the in-line four-cylinder engine E, the vicinity of the downstream central exhaust channel 2 defined by merging the plurality of upstream exhaust channels 1 is effectively cooled by the water jackets 5.

According to an example embodiment of the present invention, the direction in which the four inlet openings 6 are aligned is the same as the direction in which the three outlet openings 7 are aligned. Accordingly, as compared with a case in which the direction in which the four inlet openings 6 are aligned intersects with the direction in which the three outlet openings 7 are aligned, the size of the exhaust manifold 103 in a direction perpendicular to the direction in which the four inlet openings 6 are aligned is reduced.

According to an example embodiment of the present invention, the width W1 of the water jacket 5 between the downstream central exhaust channel 2 and the downstream side exhaust channels 3 in the direction in which the downstream central exhaust channel 2 and the downstream side exhaust channels 3 are aligned is larger than the thickness W2 of the portion of the exhaust manifold 103 between each of the downstream central exhaust channel 2 and the downstream side exhaust channels 3. Accordingly, the water jacket 5 has a relatively large width W1 between the downstream central exhaust channel 2 and the downstream side exhaust channels 3.

According to an example embodiment of the present invention, the minimum separation distance W0 (see FIG. 8) between the downstream central exhaust channel 2 and the downstream side exhaust channels 3 is about 10 mm or more, for example. Accordingly, an excessive decrease in the thickness of the exhaust manifold 103 and an excessive decrease in the width of the water jacket 5 are reduced or prevented between the downstream central exhaust channel 2 and the downstream side exhaust channels 3.

According to an example embodiment of the present invention, the engine E is provided in the hull 101, and the small marine vessel 100 includes the jet propulsion device 102 including the engine E and the impeller E4 driven by the engine E to generate a water flow and a propulsive force by the water flow. Accordingly, in a jet propulsion watercraft on which a relatively high-output engine E that is likely to become hot is mounted, the vicinity of the downstream central exhaust channel 2 defined by merging the plurality of upstream exhaust channels 1 is effectively cooled by the water jackets 5.

The example embodiments of the present invention described above are illustrative in all points and not restrictive. The extent of the present invention is not defined by the above description of the example embodiments but by the scope of the claims, and all modifications within the meaning and range equivalent to the scope of the claims are further included.

For example, while the small marine vessel is preferably a personal watercraft in example embodiments described above, the present invention is not restricted to this. In an example embodiment of the present invention, the small marine vessel may alternatively be a small boat, for example.

While the small marine vessel preferably includes the jet propulsion device as a propulsion unit in example embodiments described above, the present invention is not restricted to this. In an example embodiment of the present invention, the small marine vessel may alternatively include an outboard motor, an inboard motor, or the like as a propulsion unit instead of the jet propulsion device.

While the downstream central exhaust channel preferably has an elongated circular shape in example embodiments described above, the present invention is not restricted to this. In an example embodiment of the present invention, the downstream central exhaust channel may alternatively have an elliptical or rectangular shape, for example.

While the water jackets are preferably provided in the flange located at the most downstream location of the exhaust manifold in the exhaust flow direction in example embodiments described above, the present invention is not restricted to this. In an example embodiment of the present invention, the water jackets may not be provided in the flange located at the most downstream location of the exhaust manifold in the exhaust flow direction.

While the two downstream side exhaust channels 3 are preferably configured as a pair in example embodiments described above, the present invention is not restricted to this. In an example embodiment of the present invention, the two downstream side exhaust channels may not be configured as a pair, and may have different shapes, for example.

While the minimum separation distance between the downstream central exhaust channel and the downstream side exhaust channels is preferably about 10 mm or more in example embodiments described above, the present invention is not restricted to this. In an example embodiment of the present invention, the minimum separation distance between the downstream central exhaust channel and the downstream side exhaust channels may alternatively be less than about 10 mm.

While the direction in which the four inlet openings are aligned is preferably the same as the direction in which the three outlet openings are aligned in example embodiments described above, the present invention is not restricted to this. In an example embodiment of the present invention, the direction in which the four inlet openings are aligned may alternatively be different from the direction in which the three outlet openings are aligned.

While the downstream central exhaust channel and the two downstream side exhaust channels are preferably aligned linearly in example embodiments described above, the present invention is not restricted to this. In an example embodiment of the present invention, the downstream central exhaust channel and the two downstream side exhaust channels may alternatively be aligned in a V shape, for example.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel comprising:

a hull;

a four-cylinder engine in or on the hull; and an exhaust manifold configured to convey exhaust gas from the four-cylinder engine in an exhaust flow direction, the exhaust manifold including:

four upstream exhaust channels respectively connected to four exhaust ports of the four-cylinder engine, the four upstream exhaust channels including two upstream side exhaust channels, and two upstream central exhaust channels located between the two upstream side exhaust channels;

a downstream central exhaust channel located downstream of a merging region of the two upstream central exhaust channels;

two downstream side exhaust channels respectively located downstream of the two upstream side exhaust channels so as to be respectively spaced apart from and adjacent to the downstream central exhaust channel on opposite sides of the downstream central exhaust channel; and a water jacket extending along the exhaust channels so as to enable cooling water to flow toward the four-cylinder engine in a direction opposite to the exhaust flow direction; wherein the water jacket is configured to enable the cooling water to flow between the downstream central exhaust channel and the two downstream side exhaust channels.

2. The marine vessel according to claim 1, wherein the exhaust manifold further includes a flange including three outlet openings through which the exhaust gas is conveyed, the three outlet openings respectively corresponding to the downstream central exhaust channel and the two downstream side exhaust channels; and the water jacket is located in the flange to enable the cooling water to flow between the downstream central exhaust channel and the two downstream side exhaust channels.

3. The marine vessel according to claim 2, wherein the three outlet openings are spaced apart from each other at an exhaust outlet surface of the flange; and at the exhaust outlet surface, the water jacket is provided around an outer periphery of the three outlet openings such that the water jacket is not provided between the three outlet openings.

4. The marine vessel according to claim 1, wherein the water jacket includes a plurality of water jackets surrounding the downstream central exhaust channel.

5. The marine vessel according to claim 1, wherein the exhaust manifold further includes three outlet openings through which the exhaust gas is conveyed, the three outlet openings respectively corresponding to the downstream central exhaust channel and the two downstream side exhaust channels, each outlet opening including a same cross-sectional area.

6. The marine vessel according to claim 5, wherein the three outlet openings include a central outlet opening corresponding to the downstream central exhaust channel, and two side outlet openings respectively corresponding to the two downstream side exhaust channels;

the three outlet openings are aligned linearly in a first direction; and in a second direction perpendicular to both of the first direction and the exhaust flow direction, the central outlet opening includes an elongated shape with an opening length greater than an opening length of each of the two side outlet openings.

7. The marine vessel according to claim 6, wherein the two side outlet openings each include a circular shape; and the elongated shape of the central outlet opening is elliptical.

8. The marine vessel according to claim 1, wherein the four-cylinder engine is an in-line four-cylinder engine; and the exhaust manifold further includes:

four inlet openings aligned linearly and through which the exhaust gas is conveyed from the in-line four-cylinder engine, the four inlet openings respectively corresponding to the four upstream exhaust channels; and three outlet openings aligned linearly and through which the exhaust gas is conveyed, the three outlet openings respectively corresponding to the downstream central exhaust channel and the two downstream side exhaust channels.

9. The marine vessel according to claim 8, wherein a direction in which the four inlet openings are aligned is a same direction in which the three outlet openings are aligned.

10. The marine vessel according to claim 1, wherein, a width of the water jacket in a direction along which the downstream central exhaust channel and the two downstream side exhaust channels are aligned is greater than a thickness of a wall portion of the exhaust manifold defining the downstream central exhaust hole and the downstream side exhaust channel.

11. The marine vessel according to claim 1, wherein a separation distance between the downstream central exhaust channel and each of the two downstream side exhaust channels is at least 10 mm.

12. The marine vessel according to claim 1, wherein the four-cylinder engine is provided in the hull; and the marine vessel further comprises a jet propulsion device including the four-cylinder engine and an impeller driven via the four-cylinder engine so as to generate a water flow with a propulsive force.

13. An exhaust manifold for a conveying exhaust gas of a marine vessel in an exhaust flow direction, the exhaust manifold comprising:

four upstream exhaust channels respectively connected to four exhaust ports of a four-cylinder engine in or on the marine vessel so as to convey the exhaust gas from the four-cylinder engine, the four upstream exhaust channels including two upstream side exhaust channels, and two upstream central exhaust channels located between the two upstream side exhaust channels;

a downstream central exhaust channel located downstream of a merging region of the two upstream central exhaust channels;

two downstream side exhaust channels respectively located downstream of the two upstream side exhaust channels so as to be respectively spaced apart from and adjacent to the downstream central exhaust channel on opposite sides of the downstream central exhaust channel; and a water jacket extending along the exhaust channels so as to enable cooling water to flow toward the four-cylinder engine in a direction opposite to the exhaust flow direction; wherein the water jacket is configured to enable the cooling water to flow between the downstream central exhaust channel and the two downstream side exhaust channels.

14. The exhaust manifold according to claim 13, further comprising:

a flange including three outlet openings through which the exhaust gas is conveyed, the three outlet openings respectively corresponding to the downstream central exhaust channel and the two downstream side exhaust channels; wherein the water jacket is located in the flange to enable the cooling water to flow between the downstream central exhaust channel and the two downstream side exhaust channels.

15. The exhaust manifold according to claim 14, wherein the three outlet openings are spaced apart from each other at an exhaust outlet surface of the flange; and at the exhaust outlet surface, the water jacket is not provided at an outer periphery around the three outlet openings such that the water jacket is not provided between the three outlet openings.

16. The exhaust manifold according to claim 13, wherein the water jacket surrounds the downstream central exhaust channel.

17. The exhaust manifold according to claim 13, further comprising three outlet openings through which the exhaust gas is conveyed, the three outlet openings corresponding to the downstream central exhaust channel and the two downstream side exhaust channels, each outlet opening including a same cross-sectional area.

18. The exhaust manifold for a marine vessel according to claim 17, wherein the three outlet openings include a central outlet opening corresponding to the downstream central exhaust channel, and two side outlet openings respectively corresponding to the two downstream side exhaust channels;

the three outlet openings are aligned linearly in a first direction; and in a second direction perpendicular to the first direction and the exhaust flow direction, the central outlet opening includes an elongated shape with an opening length greater than an opening length of each of the two side outlet openings.

19. The exhaust manifold according to claim 18, wherein the two side outlet openings each include a circular shape; and the elongated shape of the central outlet opening is elliptical.

20. The exhaust manifold according to claim 13, wherein the four-cylinder engine is an in-line four-cylinder engine; and the exhaust manifold further comprises:

four inlet openings aligned linearly and through which the exhaust gas is conveyed from the in-line four-cylinder engine, the four inlet openings respectively corresponding to the four upstream exhaust channels; and three outlet openings aligned linearly and through which the exhaust gas is conveyed, the three outlet openings respectively corresponding to the downstream central exhaust channel and the two downstream side exhaust channels.

* * * * *